Jan. 9, 1934.  J. M. DAYTON  1,943,164
METER CALIBRATING DEVICE
Filed Jan. 9, 1930  2 Sheets-Sheet 1
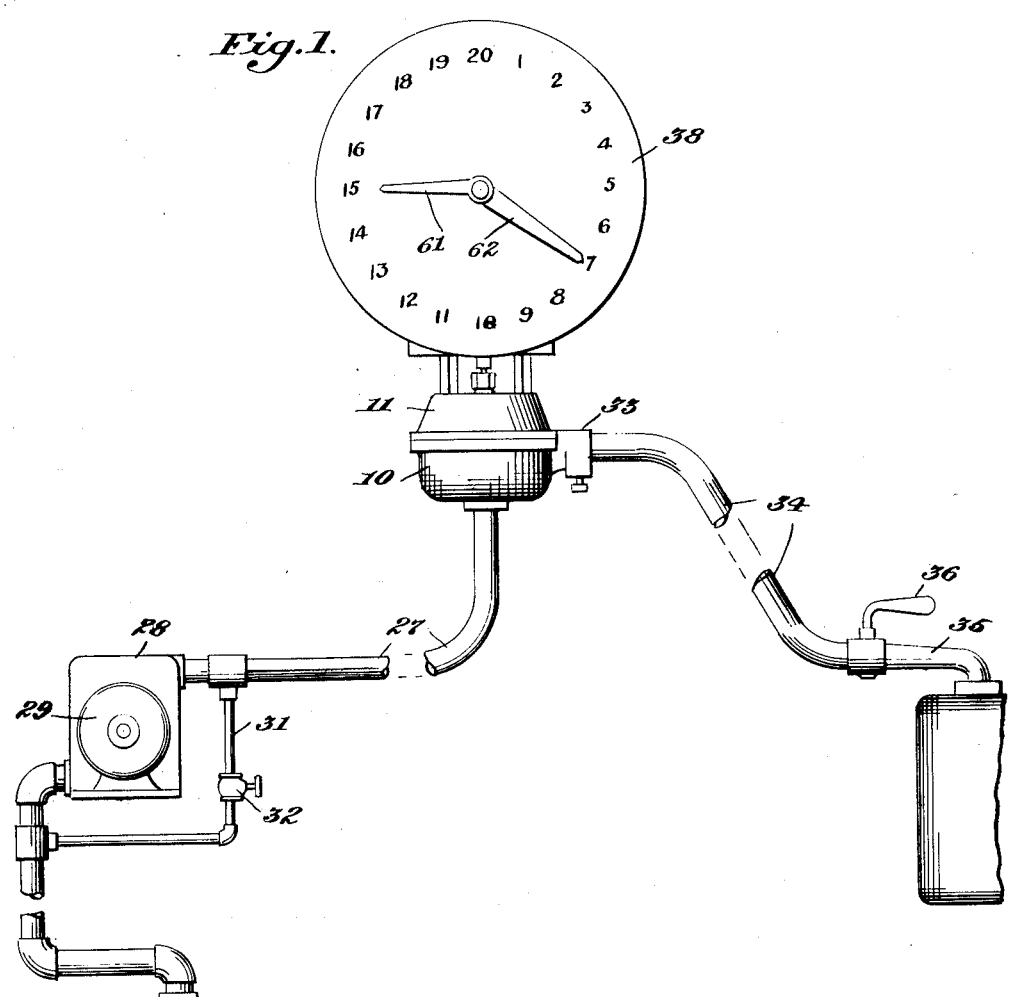
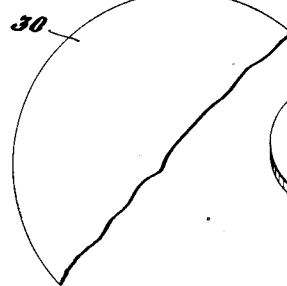
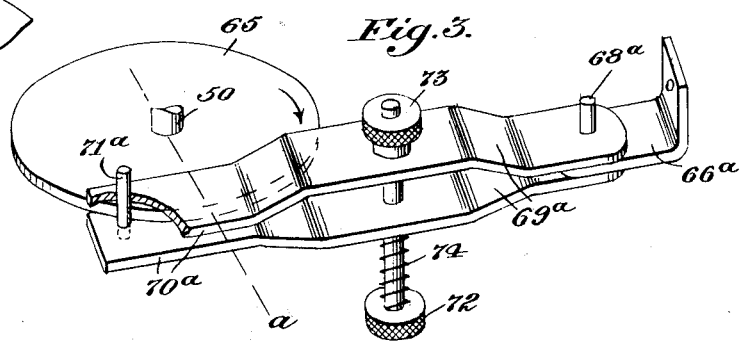
Inventor:
James M. Dayton,
by
Studwood & Mason,
Att'ys.

Jan. 9, 1934.  J. M. DAYTON  1,943,164
METER CALIBRATING DEVICE
Filed Jan. 9, 1930  2 Sheets-Sheet 2

Inventor:
James M. Dayton,
by
Att'ys.

Patented Jan. 9, 1934

1,943,164

UNITED STATES PATENT OFFICE 1,943,164

METER CALIBRATING DEVICE

James M. Dayton, Torrington, Conn.

Application January 9, 1930. Serial No. 419,693

8 Claims. (Cl. 73—98)

This invention relates to improvements in calibrating devices for flow meters, and more particularly proposes a device for employment with such meters and serving to cause the meter to register within close limits of accuracy for varying rates of flow.

It has heretofore been proposed to employ flow meters of the type which have an element positioned in the direct flow of liquid and is operated thereby for the measuring of the liquid. Such devices must be freely fitted to permit easy movement under the low heads of pressure which may prevail, and are compensated in part for variations in measurement arising from different rates of flow, by actual leakage and by the use of a by-pass from the inlet to the outlet conduits, so that a part of the liquid may flow past without acting upon the measuring mechanism.

Under the laws of some states, however, it is required that there should not be a greater variation than three and one-half cubic inches in the delivery of five standard U. S. gallons of certain valuable liquids such as gasoline, with varying rates of flow from five to twenty gallons per minute. This is a greater accuracy than can be attained with the aforementioned meters: since it amounts to a limit of accuracy of about two-tenths of one percent, while the accuracy usually required of such meters when employed for measuring water and the like is merely of the order of 2 to 5 percent.

A characteristic of certain such meters is that the leakage and by-pass flows, which may together be considered as a by-pass flow, and which are ineffective for the moving of the indicating system, constitute a greater percentage of the total flow at low rates of discharge than they do at high rates of discharge. Such, for example, is the so-called Worthington nutating piston liquids meter.

According to the present invention, means are provided for correcting this proportion of by-pass and leaking liquid with respect to the liquid actually operating the measuring system, so that a substantially fixed percentage is maintained at the different rates of flow specified. In particular, the device of the present invention is advantageous in that it imposes no excessive or unusual load upon the indicating mechanism: and cooperates with the measuring mechanism so that the meter proper can be brought into calibrated accuracy of movement with respect to the quantity of liquid passing.

Such an example of employment of the present invention is set forth on the accompanying drawings, in which:

Figure 1 is a diagrammatic view illustrating the connection of the several parts of such a liquid measuring system.

Fig. 3 is a perspective view of a modified form of frictional retarding device.

Figure 2:
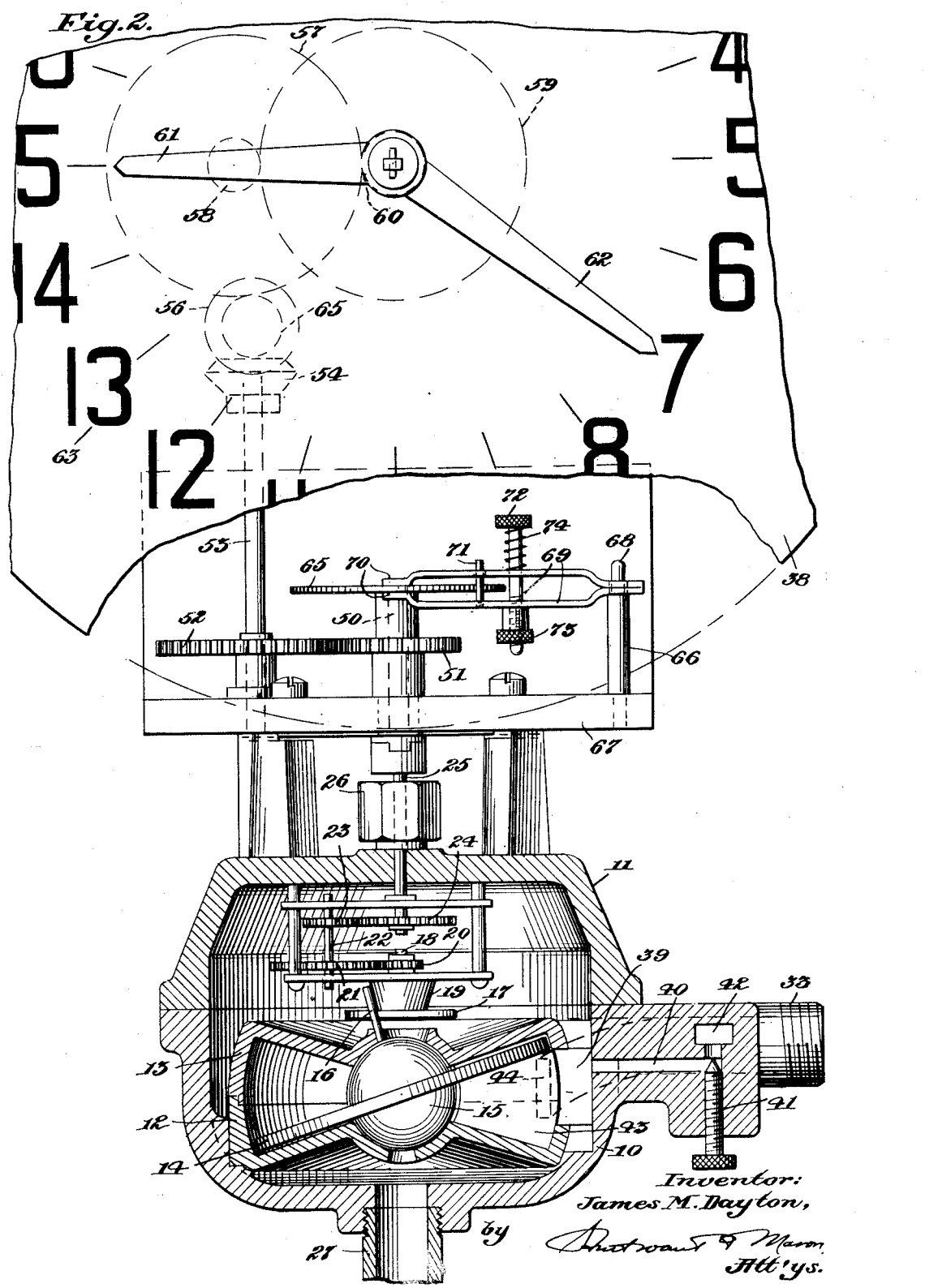
Fig. 2 is a view on a larger scale showing the parts of the illustrated nutating liquids meter, its indicating system, and the frictional retarding device.

In the drawings, the illustrative form of device includes a liquid meter having a casing in two parts 10, 11 enclosing a chamber in which is located a nutating piston cell likewise comprised of a lower member 12 and an upper member 13 which are joined liquid-tight, and which are constructed in the usual way with spherical and conical surfaces for cooperation with the periphery and faces of the nutating piston disk 14, which has a ball 15 seating it in correspondingly shaped cavities of the members 12, 13. An upstanding pin 16 fixed in the ball moves about the vertical axis in the figure during the nutation of the piston 14, and therewith drives a spider 17 fixed on the lower end of a shaft 18 which is surrounded by a guide cone 19, so that the pin 16 is guided between the wall of the top aperture in the member 13 and the wall of the cone 19. The shaft 18 carries a gear 20 in mesh with a gear 21 on a shaft 22 which carries a further gear 23 in mesh with a gear 24 on the end of the operating shaft 25 which projects through a packing joint 26 to the exterior of the casing 10, 11.

Likewise, in known manner, (Fig. 1) the member 10 is provided with an inlet conduit 27 opening into its bottom and communicating with a liquid pump 28 driven by the electric motor 29 to draw liquid from a low level storage tank 30. A by-pass 31 returns liquid from the conduit 27 to the storage tank 30 when the pressure-operated valve 32 is opened in consequence of too great a pressure existing in the conduit 27.

Likewise, the member 10 has an outlet conduit 33 leading by the hose 34 to a nozzle 35 which has a control valve therein operated by the handle 36.

The rotation of the shaft or spindle 25 is transmitted to the driven spindle 50 which has a gear 51 thereon in mesh with a gear 52 on a main indicating shaft 53 which in turn has a bevel gear 54 in mesh with a bevel gear 56 which is fixedly connected with a small pinion 65 having nineteen teeth, for example. This pinion 65 drives a large gear 57 of seventy-six teeth, the latter being rigidly and fixedly connected with a further pinion 58 having sixteen teeth which drives a large gear 59 of eighty teeth. The gear 57 also meshes with a small gear 60 of 19 teeth connected to a "fast" hand 61, while the large gear 59 is connected to a "slow" hand 62, the two hands being coaxially mounted and traveling around and over a scale having twenty indicating figures 63 thereon. It will be noted that the scale and gear ratios between the two hands are given a relative movement of 1:20 so that a full rotation of the "fast" hand corresponds to a movement of the "slow" hand by one scale division.

All of these parts are old and well known, and have been set forth merely to illustrate the employment of the present invention. In operation, the electric motor 29 is energized and therewith begins to pump liquid from the tank 30 into the pipe 27, and thence through the liquid meter to the nozzle 35. If this nozzle is closed, the liquid pressure builds up in conduit 29 and is relieved by the pressure-operated by-pass line 31; so that a substantially constant head of pressure is maintained in the conduit 27. If the valve 36 be opened, liquid runs from the nozzle 35 into the tank of an automobile, for example; this flow of liquid being measured by the movement of the nutating piston disk 14 and the indicating device 61, 62 shows the quantity which is passed. In the illustrated type of construction, the liquid entering the chamber formed by members 10, 11 flows around the outside of the cell members 12, 13 and a part enters the inner chamber thereof through an inlet port 39, while a part flows through a by-pass port 40 in member 10, past the needle valve 41 and through the port 42 into the outlet conduit 33. The liquid entering the chamber in members 12, 13 causes the nutation of the piston 14 which is held against rotation by the usual provision of a radial slot therein engaging the partition 43. The liquid therefore in effect travels as a body of measured volume, around the ball 15 and then issues through the outlet port 44 into the conduit 33. Further, there is in such devices, by reason of the loose fitting employed, always some leakage around the peripheral edges of the nutating piston 14, along the walls of its slots at the partition 43, around the ball 15, and around the inner edge of the partition 43 itself: which leakage may be considered as a part of the general quantity of liquid by-passed without effectively moving the nutating piston 14 to a corresponding degree.

Owing to the construction and arrangement of such devices of the so-called Worthington type, it is found, however, that when the valve 36 is partly closed so that a delivery at, for example, the rate of five gallons per minute occurs, there is a greater passage of liquid through the by-pass 40 and by leakage around the nutating piston 14, in proportion to the flow which causes the movement of the nutating piston 14, than when the valve 36 is open for the full discharge, say of twenty gallons per minute. One reason for this variation may be the greater back pressure existing in the conduit 33 when the valve 36 is partly closed: wherewith a lesser "drop of head" is occurring across any leakage points and across the by-pass valve 41.

According to the present invention, the operating shaft 50 also has a friction disk 65 fixed thereto.

An upstanding pillar 66 of the base plate 67 which supports the shafts 50, 53, and the dial 63 and other structure, has a reduced head 68 which passes through apertures in the respective friction pressure plates 69, which are illustrated as having the central parts displaced away from one another, but having their guided ends close together and fitting over the reduced pin 68. At the other or free end, the two members 69 are provided with pads 70 which bear with a light friction against the faces of the disk 65 adjacent its edge. A pin 71 is fixed in one of the members 69 and passes through a small aperture in the other, and thus serves to hold the two members in alinement and in definite position on the disk 65. An adjusting bolt 72 passes through an aperture in the upper plate or member 69 and is threaded into the lower plate 69 and provided on its threaded end, which projects through the lower plate 69, with a lock nut 73: while a compression spring 74 is located between its head and the adjacent or upper member 69. As the bolt 72 is turned up or down in the lower plate 69, a greater or lesser spring pressure is exerted by the spring 74 to urge the members 69 toward one another, and thus to increase the friction of the pads or friction plates 70 upon the disk 65; or to decrease this relative pressure and friction.

In operation, when it is found that a particular meter is registering erroneously, and disproportionately at trickle and full rates of discharge, the bolt 72 is moved; this frictional pressure being increased in proportion if the delivery at a full rate of discharge is less than at the trickle rate of delivery. By measuring the quantity delivered at each adjustment, the friction pressure of the pads 70 is finally established at such a point that change of the rate of discharge causes no variation in the indication upon the scale 63. It is usually found, however, that this balancing of error does not mean that the indication on the scale accurately represents the actual volume delivered, as these usually slightly differ one from another. It is possible to compensate for this variation by suitable change of the gear ratios, or by like change in the driving train: but it is preferred to accomplish this in the following manner:

The by-pass meter valve 41 is operated to cause the delivery of a proper quantity of liquid according to the scale indication at a full rate of discharge, for example. This variation of the by-pass adjustment, however, ordinarily causes the former spring adjustment to become incompetent to maintain the accuracy of indication at varying rates of delivery. The spring friction is therefore again adjusted. These operations are repeated until the desired accuracy is obtained: In each successive operation the error is a great deal less than at the preceding operation of calibration, so that the legally required correctness and correspondence between indicator and actual volume are quickly attained.

By way of example, the following table is attached, showing the results obtained by such a device in its operation.

The meter was of the Worthington nutating piston type, and connected in a system as illustrated in Fig. 1 of the drawings. For "full" rate of delivery, approximately twenty gallons were passed in one minute, while for the "trickle" rate of delivery approximately five gallons were passed in a minute. The figures under the heading "Variation" indicate the actual divergence in cubic inches in five gallons of delivery, between the indicator reading and the actual volume in the measuring can:

I. Little or no friction

Full, average of four tests_____ −25.9
Trickle, average of four tests_____ −17.0

Variation_____ 8.9

II. Friction increased

Full, average of four tests_____ −12.0
Trickle, average of four tests_____ −5.6

Variation_____ 6.4

III. Friction again increased

Full, average of two tests_____ −5.0
Trickle, average of two tests_____ −1.3

Variation_____ 3.7

IV. Friction slightly further increased

Full, average of three tests_____ 0.8
Trickle, average of three tests_____ 1.3

Variation_____ 0.5

From this it will be noted that in the first series of tests, in which the volume delivered in the can averaged 25.9 cubic inches less than the volume indicated for the "full" rate: and 17.0 cubic inches for the "trickle" rate, that about 8.9 cubic inches more was leaking during trickle delivery than during full delivery. Also, it will be noted that the rate of this leakage as between trickle and full delivery successively is decreased until its effect entirely disappears in series IV of the tests: and that in particular in this latter series, the variation is about one-seventh of the statutorily required maximum (3½ cubic inches per five gallons delivered).

Also, by adjusting the by-pass, it is possible to bring the average of these tests to zero, within limitation of testing.

In the modified form of construction shown in Fig. 3, the friction disk 65 upon the shaft 50 is engaged by a portion of the friction pads or plates 70a on the free ends of the members 69a, as before. The other ends of these members are guided by a pin 68a carried on a bracket 66a secured to the indicating frame. The guide pin 71a is here carried by one of the members 69a as before, and in this instance bears against the periphery of the friction disk 65 at a point beyond the effective center of pressure of the friction plates 70a upon the disk 65. A bolt 72 provided with a lock nut 73 and a compression spring 74 as before serves for regulating the relative resilient frictional pressure of the pads 70a. In this instance, especially, the effective center of frictional effort of the pads 70a upon the friction disk 65 is preferably beyond the radial line a which is at a right angle to the general direction of the member 69a, so that the rotation of the disk in the direction of the arrow tends to draw the member 69a toward the axis of shaft 50, and thus maintains the pin 71a against the periphery of the friction disk 65. The operation of this structure is the same as before.

It is obvious that the invention is not limited to the specific form and combination employed, but that it may be modified in many ways within the scope of the appended claims.

What I claim as new and desire to secure by Letters Patent is:

1. In a liquid measuring system, the combination of a liquid meter including a liquid inlet and a liquid outlet and a device operated by the flow of the liquid for measuring the flowing liquid and provided with an auxiliary passage for liquid from the meter inlet to the meter outlet and having a greater proportion of the total flow at a low rate of discharge passing through said auxiliary passage than at a high rate of discharge, and including a frame, an indicating system and a driving shaft therefor connected to said device, a friction member driven by said shaft, and friction means fixed to the frame and engaged with said friction member for constantly imposing a retardation upon the movement of said shaft, and a spring for maintaining said friction means engaged with said friction member.

2. In a liquid measuring system, the combination of a liquid meter including a liquid inlet and a liquid outlet and a device operated by the flow of the liquid for measuring the flowing liquid and provided with an auxiliary passage for liquid from the meter inlet to the meter outlet and having a greater proportion of the total flow at a low rate of discharge passing through said auxiliary passage than at a high rate of discharge, and including a frame, an indicating system and means actuated by said device for driving said system, and friction means including a device fixed to the frame for imposing a constant retardation upon the movement of said driving means, and a spring for maintaining said friction means engaged with said friction member.

3. In a liquid measuring system, the combination of a nutating piston liquid meter including a liquid inlet and a liquid outlet and a nutating piston and an auxiliary passage from the inlet to the outlet and having a greater proportion of the total flow at a low rate of discharge passing through said auxiliary passage than at a high rate of discharge, and an indicating system including a driving shaft operated by the nutating piston, of a friction disk fixed on said shaft, a friction plate constantly bearing against said disk to retard the same, and means for varying the pressure of said friction plate upon said disk.

4. In a liquid measuring system, the combination of a nutating piston liquid meter including a liquid inlet and a liquid outlet and a nutating piston and an auxiliary passage from the inlet to the outlet and having a greater proportion of the total flow at a low rate of discharge passing through said auxiliary passage than at a high rate of discharge, and an indicating system including a driving shaft operated by the nutating piston, of a friction disk fixed on said shaft, a pair of friction plates constantly bearing against opposite faces of said friction disk, and means to vary the pressure of said plates upon said disk.

5. In a liquid measuring system, the combination of a nutating piston liquid meter including a liquid inlet and a liquid outlet and a nutating piston and an auxiliary passage from the inlet to the outlet and having a greater proportion of the total flow at a low rate of discharge passing through said auxiliary passage than at a high rate of discharge, and an indicating system including a driving shaft operated by the nutating piston thereof, of a friction disk fixed on said shaft, a pair of elongated friction members, means to support said members at one end, said members being provided at their other ends with friction plates constantly engaging opposite faces of said disk, and resilient means to urge said members toward one another whereby to provide the pressure of said plates against said disk.

6. A liquid measuring system as in claim 5, in which said resilient means includes a bolt threaded in one of said members and passing through the other member and having a head, and a spring surrounding said bolt and operating between said head and said other member.

7. In a liquid dispensing system including a source of liquid under substantially constant pressure, a liquid meter including a liquid inlet connected to said source and a liquid outlet and including an indicating system and a flow actuated device for measuring the flow of liquid through said meter and connected for driving said system, means for controlling the rate of flow from said liquid outlet, and means for providing a regulatable auxiliary passage for liquid from the meter inlet to the meter outlet, the combination therewith of a device for imposing a frictional retardation on said indicating system, and a spring for maintaining said device in frictional engagement with said indicating system.

8. A liquid dispensing system as in claim 7, including means for adjusting the stress in said spring whereby to vary the frictional retardation exerted by said device upon said indicating system.

JAMES M. DAYTON.